United States Patent [19]

Maier et al.

[11] 4,099,763

[45] Jul. 11, 1978

[54] SEAL CONSTRUCTION FOR VEHICLES

[75] Inventors: Roger F. Maier, Peoria; Jimmy L. Milligan, Pekin; William A. Bahnfleth, East Peoria; James L. Taylor, Washington, all of Ill.

[73] Assignee: Caterpillar Tractor Co., Peoria, Ill.

[21] Appl. No.: 746,568

[22] Filed: Dec. 1, 1976

[51] Int. Cl.² ............................................. B62D 27/00
[52] U.S. Cl. .................................... 296/28 C; 49/493; 296/93
[58] Field of Search ................ 296/28 C, 93; 49/493, 49/479

[56] References Cited

U.S. PATENT DOCUMENTS

| | | | |
|---|---|---|---|
| 1,337,394 | 4/1920 | Dillingham | 296/93 |
| 2,169,792 | 8/1939 | Dean | 49/493 |
| 2,474,409 | 6/1949 | Anderson | 49/479 |
| 2,475,332 | 7/1949 | Merrill | 49/479 |
| 2,728,982 | 1/1956 | Merrill | 49/479 |
| 3,562,957 | 2/1971 | Landis | 49/493 |
| 3,685,206 | 8/1972 | Kessler | 49/489 |
| 3,845,981 | 11/1974 | Whitfield | 296/28 C |

FOREIGN PATENT DOCUMENTS

| | | | |
|---|---|---|---|
| 497,022 | 10/1953 | Canada | 296/93 |
| 455,936 | 3/1950 | Italy | 49/479 |

Primary Examiner—Robert R. Song
Assistant Examiner—John A. Carroll
Attorney, Agent, or Firm—Frank L. Hart

[57] ABSTRACT

A seal construction including a metallic channel having a base, spaced side walls extending from the base in the same direction, and arms spaced from the base on the side walls and having ends directed toward, but spaced, from each other. A resilient strip is removably captured in the channel and extends therefrom for engagement with an element to be sealed. The channel base may be welded to a metallic element prior to insertion of the resilient strip to obviate the need for aligned openings for securing means such as screws, bolts, or the like and/or bonding agents of dubious reliability in varying environments.

10 Claims, 3 Drawing Figures

U.S. Patent  July 11, 1978  4,099,763
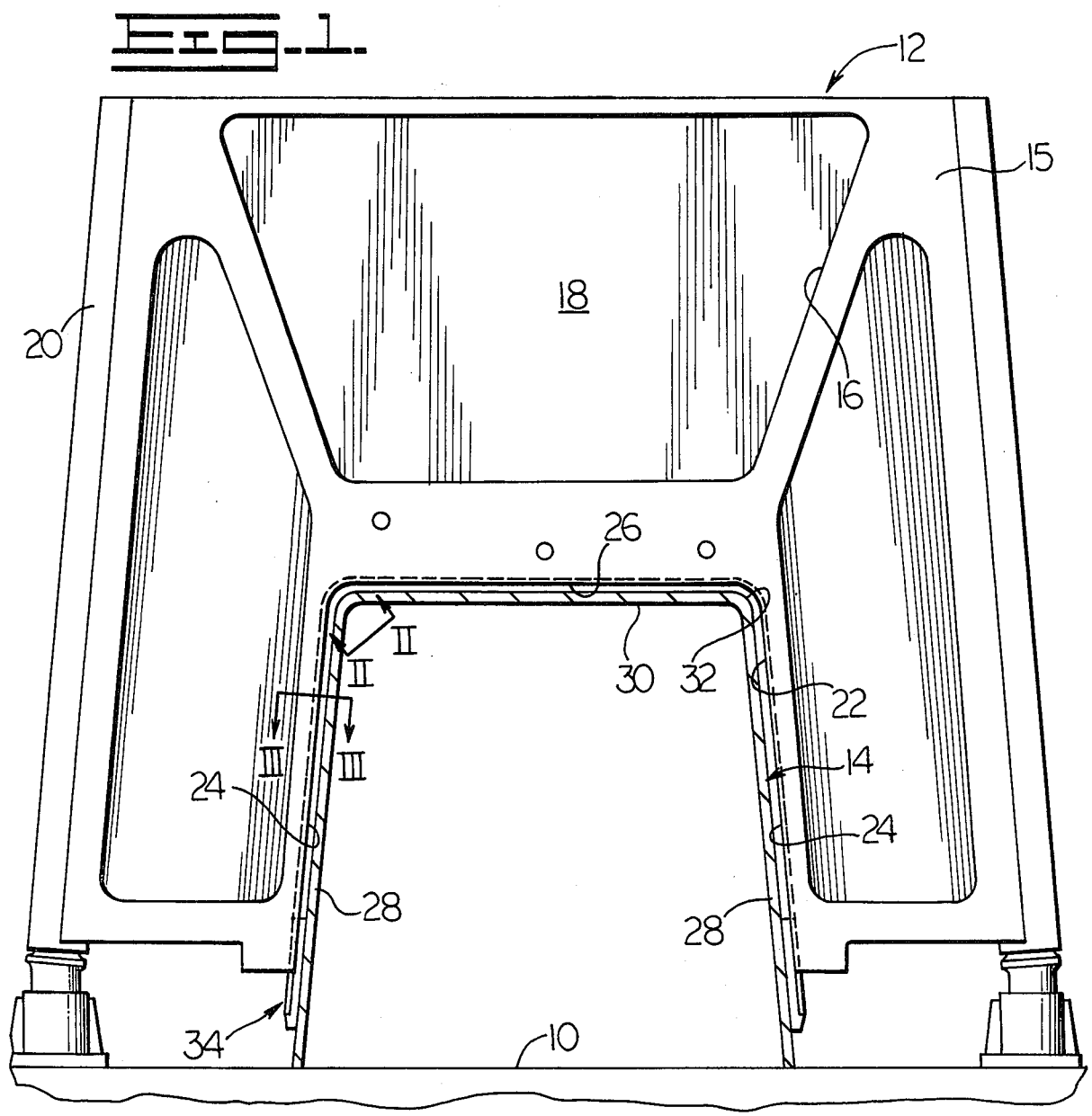
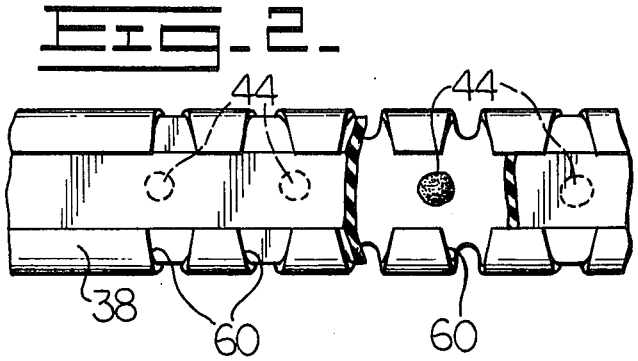
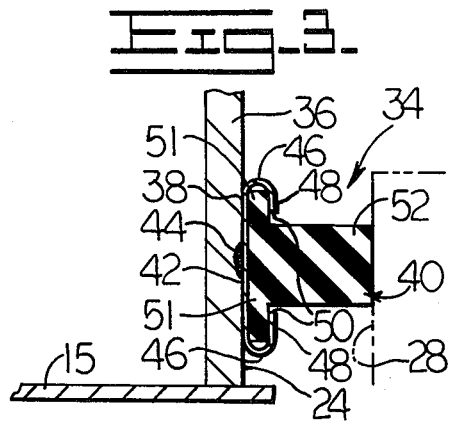

SEAL CONSTRUCTION FOR VEHICLES

BACKGROUND OF THE INVENTION

This invention relates to seal constructions, and more particularly, to seal constructions adapted for use in vehicles or the like.

Prior art of possible relevance includes the following U.S. Letters Patents Nos.: Dean 2,169,792 issued Aug. 15, 1939; Landis 3,562,957 issued Feb. 16, 1971; and Kessler 3,685,206 issued Aug. 22, 1972.

In vehicles, such as tractors or the like, the cabs and the fire walls including the dash are frequently independently mounted on the frame. Since the dash must extend into the cab, and because of the independent mounting of the components, frequently relative movement between the two occur. Moreover, tolerances employed in such constructions are not so demanding that a tight fit can be assured in every instance. Consequently, resilient seals are employed at the interface of the cab and the fire wall for the purpose of accommodating limited relative movement between such components as well as to close the opening between the components to preclude the entry into the operator area of the cab of noise, foreign material, or the like.

Heretofore the prior art has generally resorted to use of metallic strips or the like sandwiching part of a resilient strip against either the cab or the fire wall with the resilient strip extending past the metallic strip to engage the other of the cab and the fire wall and establish the seal. Screws or the like have been employed for holding the metallic strip in place, thereby requiring aligned openings in the metallic strip and either the cab or the fire wall, depending upon which the metallic strip is secured to. The requirement that such openings be aligned is a difficult one to meet in mass production and considerable time and monies are expended to do so.

As a consequence, prior art has resorted to the use of bonding agents as, for example, cements, for cementing the resilient strip to one of the elements. However, this approach has not been altogether satisfactory for the reason that the bonding agents are often rejected due to the chemical contents of the components and even due to the ventilation of the work area in which the bonding is to take place. The condition of the mating surfaces also becomes critical inasmuch as oil, dirt, rust, paint, etc., must be removed from the surfaces before a reliable bond can be obtained. Even when a good bond is obtained in the factory, operation of the vehicle under extremely adverse ambient temperature conditions can cause failure of the bond.

SUMMARY OF THE INVENTION

It is a principal object of the invention to provide a new and improved seal particularly suited for use in vehicles. More specifically, it is an object of the invention to provide such a seal wherein the need for aligned openings in components to be secured together is obviated and no reliance need be placed on bonding agents of dubious reliability.

An exemplary embodiment of the invention achieves the foregoing objects in a seal construction including a metallic channel having a base, spaced side walls extending from the base in the same direction, and arms spaced from the base on the side walls and having ends directed toward, but spaced from, each other. A resilient strip having oppositely directed tabs is removably captured in the channel and extends therefrom for engagement with an element to be sealed. The channel base may be welded to a metallic element prior to insertion of the resilient strip in the channel thereby obviating the need for aligned openings to receive fasteners or the like and eliminating the need for bonding agents of dubious reliability.

In a highly preferred embodiment, where the channel must be conformed to the shape of an element on which it is to be mounted, the channel includes slots in the sides and arms which partially extend into the base to facilitate bending of the channel to conform to the shape of the element on which it is to be mounted. In general, the slots will be formed in the channel only in the vicinity where bends are to be made as, for example, at the corners of an opening.

The invention also contemplates an improved vehicle construction including a frame, a fire wall having plural sides mounted on the frame, a cab structure mounted on the frame separately of the fire wall and having a multi-sided opening through which the fire wall extends with sides of the opening closely adjacent corresponding sides of the fire wall. The channel mentioned previously is mounted on one or the other of the cab and the fire wall and where the element on which it is mounted is metallic, it is welded thereto by welds spaced along the length of the channel. The resilient strip extends from the channel to engage the other of the cab and the side wall.

Preferably, the channel is mounted on the cab and the resilient strip engages the fire wall.

Other objects and advantages will become apparent from the following specification taken in connection with the accompanying drawings.

DESCRIPTION OF THE DRAWINGS

FIG. 1 is an elevational view of a cab and fire wall construction for a vehicle with the fire wall being shown in section and additionally showing part of the vehicle frame;

FIG. 2 is a view of the sealing means of the present invention taken approximately along line 2—2 in FIG. 1; and FIG. 3 is a sectional view of the seal taken approximately along line 3—3 in FIG. 1.

DESCRIPTION OF THE PREFERRED EMBODIMENT

An exemplary embodiment of an improved seal construction made according to the invention is illustrated in FIG. 1 in the environment of a vehicle structure. The vehicle structure includes a frame, fragmentarily shown at 10, which independently mounts a cab structure, generally designated 12, and a fire wall, generally designated 14, which extends into the operator area housed by the cab 12 to mount a dash or the like.

The cab 12 is formed of a plurality of sheet metal panels 15 appropriately interconnected with openings 16 therein for windows 18 or the like. The cab structure 12 may also include a roll-over protection structure including upwardly extending posts 20 and cross members, not shown. The front sheet metal panel 15 includes an opening 22 in its lower center through which the fire wall 14 extends, as mentioned previously. The opening 22 includes spaced, generally vertically extending sides 24 interconnected at their tops by a generally horizontally extending side 26. As can be seen from FIG. 1, sides 24 and 26 generally parallel corresponding sides 28 and 30 of the fire wall 14. Corners between the sides of the various components preferably are slightly rounded as at 32.

A sealing structure, generally designated 34, is secured to the cab 12 about the opening 22 by means to be described in greater detail hereinafter, sealingly engages, about the entire periphery of the opening 22, the corresponding sides of the fire wall 14.

Referring now to FIGS. 2 and 3, the construction of the seal 34 will be described in greater detail. In particular, the sheet metal structure 15 forming the front panel of the cab 12 mounts a rearwardly directed metallic member 36 which is generally parallel to the corresponding one of the sides 28 and 30 of the fire wall, the side 28 being shown in FIG. 3.

The seal 34 includes a channel 38 and a resilient strip 40. The channel 38 removably captures the resilient strip 40 to mount the same for sealing engagement with the wall 28.

More specifically, the channel 38 includes a base 42 which is secured, by a series of spot welds 44, along its length to the metallic panel 36 about the opening defined by sides 24 and 28. Each side of the base 42 includes sides 46 extending therefrom in the same direction, namely, away from the panel 36 and toward the wall 28. The ends of the sides 46 mount integrally-formed, inwardly-directed arms 48 which terminate in ends 50 facing each other but spaced from each other to define an opening through which oppositely directed tabs 51 on the resilient strip 40 may be removably captured within the channel 38 and through which a portion 52 of the strip 40 extends to sealingly engage the wall 28.

As a consequence of this construction, the channel 38, without the resilient strip 40, can be secured to a metallic panel such as the panel 36, as mentioned previously, by the spot welds 44, thereby obviating any need for aligned openings for receipt of threaded fasteners or the like. At the same time, since welds such as the welds 44 are employed, bonding agents need not be employed to secure the channel 38 to the panel 36, thereby eliminating the difficulties associated with the use of bonding agents, as mentioned previously.

After the channel 38 has had its base 42 secured to the panel 36 and the welds 44 made, the strip 40 may then be inserted into channel to be captured thereby as mentioned previously.

In order to facilitate the use of the single channel 38 and a single strip 40 sealing the entire periphery of the opening between the walls 24 and 28 and the walls 26 and 30, there are provided a plurality of notches 60, best seen in FIG. 2. The notches 60, as seen in FIG. 2, are generally V-shaped and extend through the arms 48, the side 46, and partially through the base 42 of the channel 38 in a direction generally transverse to the direction of elongation of the channel 38 with the wider part of the V being disposed in the arms 48 and the narrower part of the V being disposed in the base 42. The notches 60 are located in the vicinity of the corners 32 and thereby facilitate bending of the channel 38 in such areas without deformation of the sides 46 or the arms 48 which would allow escape of the resilient strip 40.

As a result of the foregoing, it will be appreciated that a seal made according to the invention is easily fabricated to allow ready conformation to nonplanar shapes as by bending of the channel 38. It will also be appreciated that the need for the provision of aligned openings for threaded fasteners, and the resultant cost of providing such openings, is totally eliminated. It will also be appreciated by those skilled in the art that the welds 44 quite adequately bond the channel 38 to the metallic element on which it is to be mounted. As a result, surface treatment normally associated with the use of bonding agents may be eliminated. At the same time, there is no failure of a bonding agent in adverse operating conditions. Thus, a seal made according to the invention provides a significant advance over those heretofore used in accomplishing the same functions more reliably and with lesser expense.

We claim:

1. A vehicle construction including:
   a. a frame;
   b. a fire wall having plural sides mounted on said frame;
   c. a cab structure mounted on said frame separately of said fire wall and having a multi-sided opening through which said fire wall extends with sides of said opening closely adjacent corresponding sides of said fire wall; and
   d. a seal on one of the fire wall and the cab at said opening and engaging the other of the cab and the fire wall to seal said opening, said seal including an elongated channel having a base, opposed sides extending from the base in the same direction, and arms on each said opposed side and spaced from the base, the ends of said arms being directed toward, but spaced from, each other to define an access opening to the interior of said channel, and a resilient strip having oppositely directed tabs, removably received in said channel and extending from said access opening and resiliently contacting said other of said cab and said fire wall.

2. The vehicle construction of claim 1 wherein said channel base is secured to said cab.

3. The vehicle construction of claim 1 wherein said channel base is secured to said cab by a plurality of welds in said base along the length thereof.

4. The vehicle construction of claim 1 wherein each of said channel arms and opposed sides and said base includes slots generally transverse to the length of said strip in the vicinity of the corners of said opening.

5. The vehicle construction of claim 4 wherein each said slot is wider in said opposed sides than in said base.

6. The vehicle construction of claim 5 wherein each said slot is generally V-shaped.

7. A sealed interface comprising:
   a. a metallic member having two sides joined by a corner;
   b. an element to be sealed having two sides joined by a corner and generally parallel to the sides of said metallic member and spaced therefrom to define an opening to be sealed;
   c. a metallic channel having a base, spaced side walls extending from said base in the same direction, and arms spaced from said base on said side walls and having ends directed toward, but spaced from, each other;
   d. welds in said channel base securing said channel base to said metallic member on one side of said opening;
   e. a resilient strip having opposed tabs removably captured in said channel and engaging said element to be sealed; and
   f. a plurality of slots in the side walls and arms of said channel in the vicinity of said corner.

8. A sealed interface comprising:
   a. a metallic member having a side;

b. an element to be sealed having a side generally parallel to and spaced from said side of said metallic member to define an opening;
c. a metallic channel having a base, spaced side walls extending from said base in the same direction, and arms spaced from said base on said side walls and having ends directed toward, but spaced from, each other;
d. welds in said channel base securing said channel base to said metallic member on one side of said opening; and
e. a resilient strip having opposed tabs removably captured in said channel and engaging said element to be sealed.

9. A seal comprising:
a. a metallic channel having a base, spaced side walls extending from said base in the same direction, and arms spaced from said base on said side walls and having ends directed toward, but spaced from, each other;
b. a resilient strip having opposed tabs removably captured in said channel and extending therefrom for engagement with an element to be sealed,
c. whereby said channel base may be welded to a metallic element prior to insertion of said resilient strip in said channel to obviate the need for aligned openings for securing means and/or bonding agents of dubious reliability in varying environments.

10. The seal of claim 9 wherein said channel includes slots in said side walls and arms and partially entering said base to facilitate bending of said channel to conform to the shape of an element on which it may be mounted by welding.

* * * * *